United States Patent
Stouder

[11] 3,882,628
[45] May 13, 1975

[54] BAIT BUCKET ASSEMBLY

[76] Inventor: Virgil E. Stouder, 313 N. 18th St., Independence, Kans. 67301

[22] Filed: Jan. 12, 1973

[21] Appl. No.: 323,311

[52] U.S. Cl. .................................. 43/55; 220/17
[51] Int. Cl. ........................................... A01k 97/04
[58] Field of Search .......... 43/55, 56, 122; 220/16, 220/17; 62/457, 464, 465

[56] References Cited
UNITED STATES PATENTS

| | | | |
|---|---|---|---|
| 648,436 | 5/1900 | Rider | 43/122 |
| 2,740,546 | 4/1956 | Kowalski | 43/56 |
| 3,452,469 | 7/1969 | White | 43/55 |
| 3,472,568 | 10/1969 | Southwick | 220/17 |
| 3,670,918 | 6/1972 | Mitchell | 220/17 |

Primary Examiner—Warner H. Camp
Attorney, Agent, or Firm—Cushman, Darby & Cushman

[57] ABSTRACT

A bait bucket assembly of the type including a container molded of foamed plastic having a bottom wall and a peripheral wall extending upwardly from the periphery of the bottom wall and a lid molded of foamed plastic movable between opened and closed relation with the container so as to define an accessible insulated interior chamber therein, in which the bottom wall is provided with one or more interior threaded surfaces formed in the central portion of the chamber defining surface thereof spaced inwardly from the juncture of the peripheral wall therewith, and one or more bait receptacles are provided each having a bottom wall and a peripheral wall extending upwardly from the periphery thereof, the bottom portion of each bait receptacle having exterior threaded surfaces complementary with an associated interior surface for detachable engagement therewith to fixedly secure each bait receptacle within the chamber in an operative position therein wherein the peripheral wall thereof extends upwardly from the bottom wall of the container in annularly spaced relation with the peripheral wall thereof, the exterior size of each bait receptacle is substantially less than the interior size of the chamber so as to provide a substantial space within the chamber exteriorly of the peripheral wall of each bait receptacle for the support of ice therein capable of maintaining bait and the like disposed within each bait receptacle in a fresh condition for an extended period of time.

3 Claims, 4 Drawing Figures

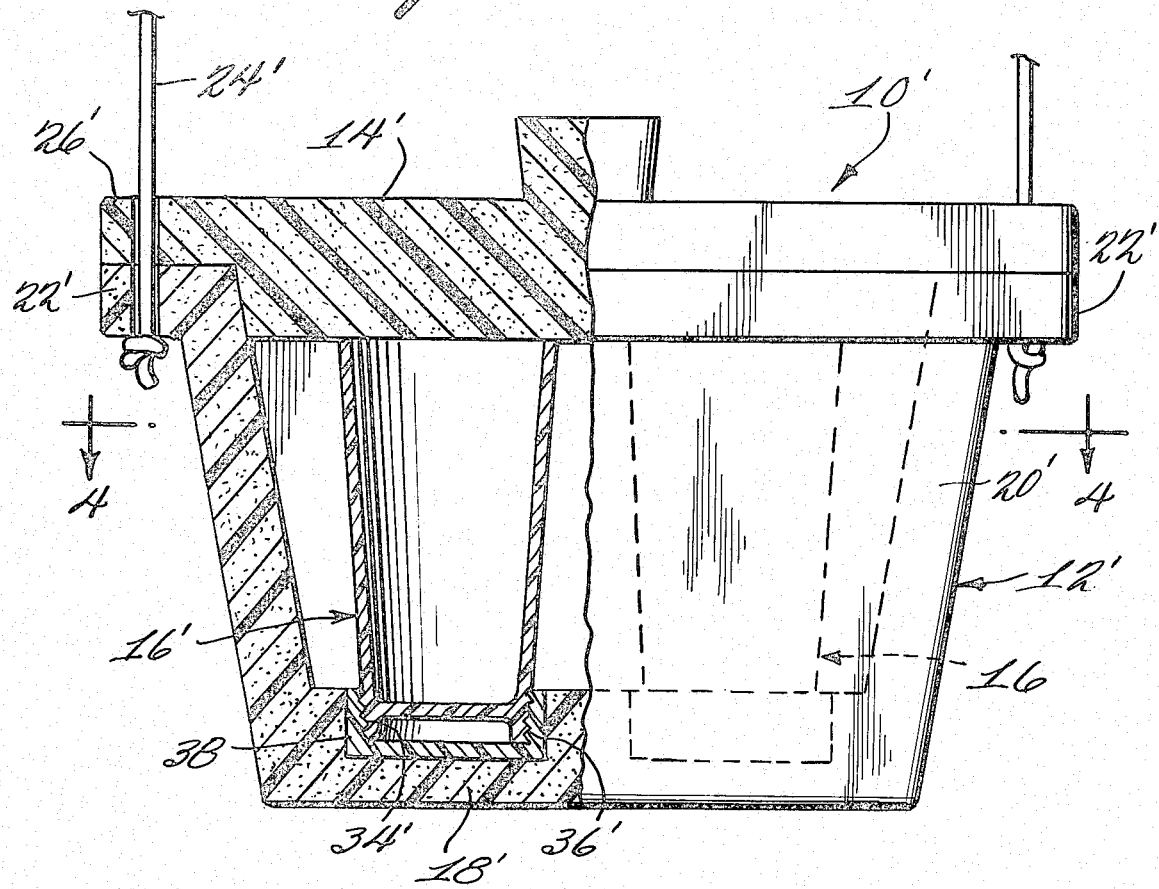
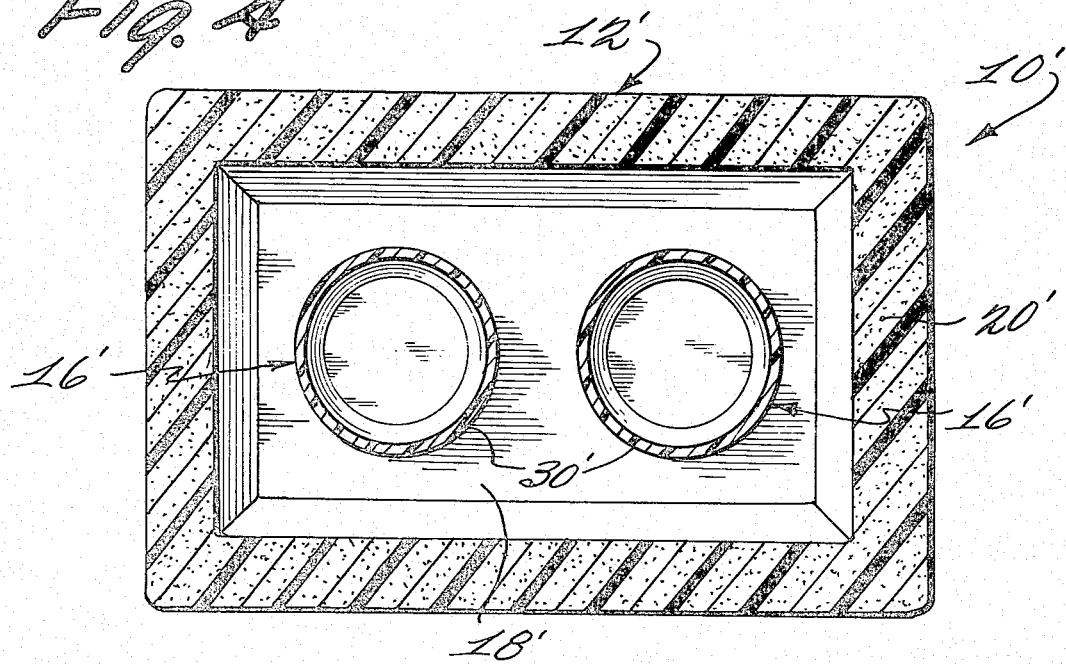

BAIT BUCKET ASSEMBLY

This invention relates to bait bucket assemblies and more specifically to improvements in such assemblies which render them more efficient and versatile in use.

Bait bucket assemblies of the type embodying a foamed plastic container and a lid of foamed plastic have been in use for many years. It has been proposed to provide a separate inner receptacle for use with such known bait bucket assemblies. Examples of proposals of this type are disclosed in U.S. Pat. Nos. 3,452,469 and 3,654,773. In the first of the above-noted patents, there is provided an inner receptacle with lid which fits within the lower portion of the bait bucket container. This inner receptacle, when filled with ice or other coolant, seems to refrigerate bait stored in the container above the receptacle. In the later patent, the inner receptacle is constructed to receive the bait and is suspended within the upper portion of the container by engagement of an upper annular flange of the receptacle with the open top of the container. In this construction, the lower portion of the container serves to support the ice or other coolant for the bait within the receptacle.

An object of the present invention is to provide a bait bucket assembly of the type described having an improved bait receptacle means operatively supported therein in such a way as to provide greater versatility in use, while at the same time maintaining a highly desirable simplicity and economy of manufacture. In accordance with the principles of the present invention this objective is obtained by providing interior surface means within the bottom wall of the bucket container which is spaced from the peripheral wall means thereof and providing bait receptacle means which includes exterior surface means complementary to the interior surface means which is detachably engageable therewith to secure the bait receptacle means within the chamber of the container in an operative position. With this construction, which can be provided by conventional plastic molding procedures, a maximum exterior surface area of the bait receptacle means is exposed to the coolant, e.g. ice, supported in the container, the bait receptacle means is readily detachable from the container, when desired, but is retained therein against a floating action or the like (as when the ice melts) to insure separation of the bait from the coolant. The arrangement is further desirable in that it enables the operator to use a single lid to cover both the bait receptacle means and the container and provides the capability, where desired, to include more than one bait receptacle for holding more than one type of bait.

Another object of the present invention is the provision of an improved bait bucket assembly of the type described which is simple in construction, economical to manufacture, effective in operation and versatile in use.

These and other objects of the present invention will become more apparent during the course of the following detailed description and appended claims.

The invention may best be understood with reference to the accompanying drawings wherein an illustrative embodiment is shown.

In the drawings:

FIG. 3 is a vertical sectional view of another form of bait bucket assembly embodying the principles of the present invention; and FIG. 4 is a sectional view taken along the line 4—4 of FIG. 3.

Figure 1:
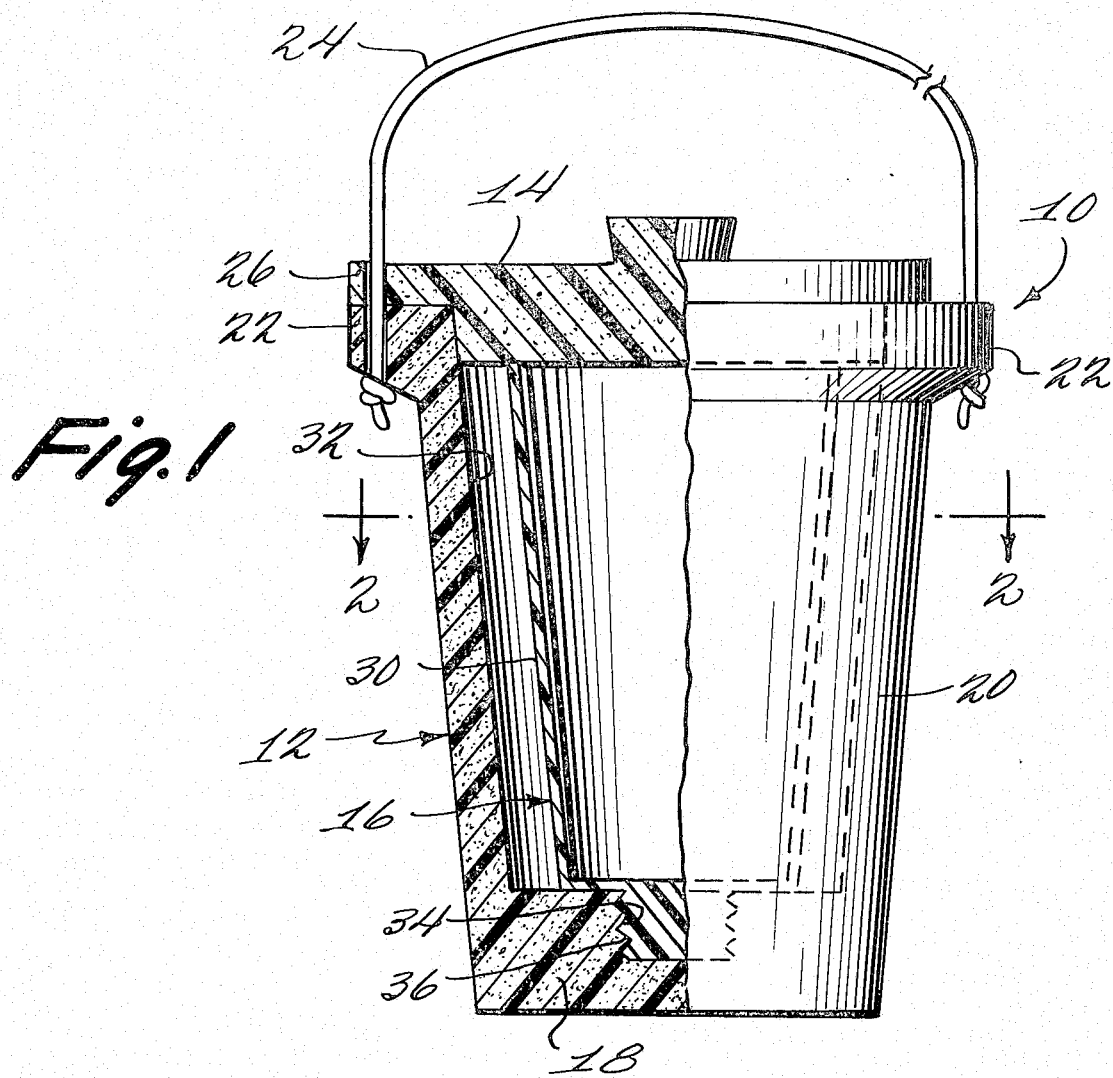
FIG. 1 is a vertical sectional view of one form of bait bucket assembly embodying the principles of the present invention.
Figure 2:
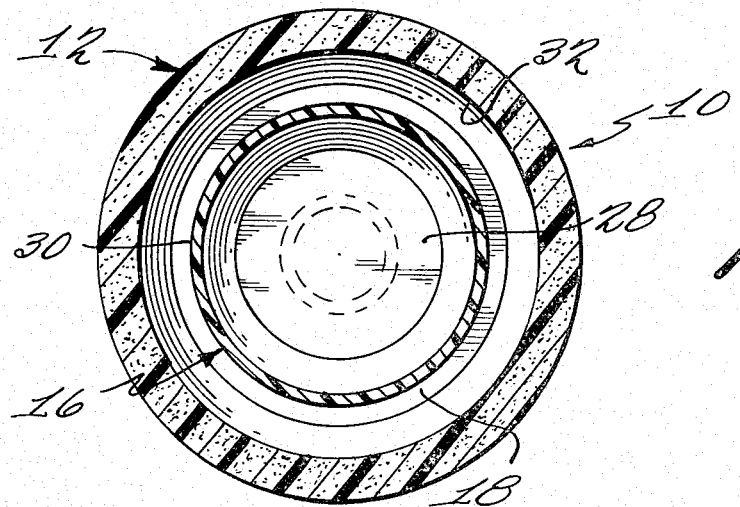
FIG. 2 is a sectional view taken along the line 2—2 of FIG. 1.

Referring now more particularly to the drawings, there is shown in FIGS. 1 and 2 thereof one form of a bait bucket assembly, generally indicated at 10, which embodies the principles of the present invention. The assembly 10 includes an opened top container, generally indicated at 12, a lid 14 movable into opened and closed relation with the container 12 and a bait receptacle, generally indicated at 16, detachably mounted within the container 12.

The container 12, as shown, is preferably molded of foamed plastic, such as polystyrene or the like, and includes a bottom wall 18 which, as shown, is of circular configuration in plan and peripheral wall means 20 extending upwardly from the periphery of the bottom wall. In the embodiment shown, the peripheral wall means 20 is of upwardly diverging frustoconical configuration, terminating at its upper end in an annular rim construction having a pair of diametrically opposed lug portions 22 formed thereon. Each of the lug portions 22 is vertically apertured to receive therethrough one end of an elongated flexible bail 24 in the form of rope or the like, the ends of which are knotted after being passed through the apertured lug portions 22.

The lid 14 is also preferably molded of a foamed plastic, such as polystyrene or the like, and includes an outwardly extending annular flange for engaging the annular rim of the container 12. The annular flange of the lid includes at least one lug portion 26 extending outwardly thereof which is apertured to receive one end portion of the bail 24 therethrough.

The bail receptacle 16 is preferably molded of a suitable plastic material, such as polystyrene, polyethylene or the like, and includes a bottom wall 28 and peripheral wall means 30 extending upwardly from the periphery thereof. In the embodiment shown, the bottom wall 28 of the bait receptacle 16 is circular in plan and the peripheral wall means is of upwardly diverging frustoconical configuration. It will be understood that both the container 12 and receptacle 16 may assume other configurations, it being essential merely that the receptacle be of an exterior size substantially less than the interior size of the container so that when the receptacle is fixedly secured in operative relation within the interior chamber defined by the container and lid there is provided an annular space, indicated at 32 in the drawings, within which to support a coolant, such as ice or the like.

As shown, when the receptacle 16 is secured in operative position within the container, the peripheral wall 30 of the receptacle extends upwardly from the bottom wall 18 of the container 12 in spaced relation to the peripheral wall 20 thereof. In accordance with the principles of the present invention, cooperating surface means is provided for detachably securing the receptacle 16 in operative position within the container 12. As shown, such means includes interior surface means 34 formed in the central interior portion of the bottom wall 18. As shown, the interior surface means is in the form of an annular interiorly threaded surface formed in surrounding relation to a recess formed in the central portion of the bottom wall 18.

The bottom wall 28 of the receptacle 16 is formed with exteriorly threaded surface means 36 complementary to the interiorly threaded surface means 34. As shown, the exteriorly threaded surface means 36 is formed on the periphery of a depending annular portion formed integrally on the central exterior of the bottom wall 28 of the receptacle 16 of a size to engage within the recess. It will be understood that the cooperating surfaces may assume other configurations and that the male-female relationship of the structures providing the surfaces may be reversed.

The receptacle 16 may be closed by a separate lid or cover of conventional construction, however, as shown, it is preferable to form the receptacle 16 with a vertical dimension such that its open upper end is engaged by the lid 14 when the latter is disposed in closing relation with the container 12 and the receptacle is secured into its operative position therein.

In use, the container 12, lid 14 and bail 24, with the receptacle 16 removed therefrom, can be employed in conventional fashion as an ordinary standard minnow bucket. However, by threadedly engaging the receptacle 16 into its operative position, it now becomes possible for the space 32 to be filled with ice in a manner which maintains it out of contact with the interior of the receptacle but yet in a highly efficient heat transfer relation therewith. Receptacle 16 can be filled with water to receive minnows therein in which case the minnows will be kept live for an extended period of time by the cool water. The ice in space 32 will last longer by not being in the minnow water and will not pollute the same. Moreover, the ice space can be readily recharged with fresh ice when necessary. If minnows die and spoil in an ordinary foamed plastic bucket, it usually taints the bucket and immediately kills all minnows if used again. However, with the use of the receptacle 16, which is made of a more durable and washable non-foamed plastic material, such taint can be eliminated by washing. In addition, the receptacle provides an excellent environment to store baits other than minnows. Worms or crayfish stay fresh and more readily accessible therein. Blood baits, such as livers and other prepared baits, are not ruined by water from thawing ice therein. Frozen baits can readily thaw therein without subsequently spoiling.

It will be understood that the assembly 10 is subject to many changes without departing from the principles of the present invention. Several of such changes and variations are exemplified in the alternative embodiment shown in FIGS. 3 and 4 in which corresponding parts are designated by corresponding primed reference numerals. As shown, the container 12' is rectangular in plan rather than circular, as before, and includes a plurality of receptacles 16', specifically two. Each receptacle 16' has the exteriorly threaded surface means 36' formed on the lower part of the peripheral wall means 30' thereof rather than on a central depending portion on the bottom wall 28'. The cooperating complementary interiorly threaded surface means 34' for each receptacle is provided by an annular insert 38 which is separately molded of a suitable plastic material such as polystyrene, polyethylene or the like, and then cemented within the recess.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. In a bait bucket assembly of the type including a container molded of foamed plastic having a bottom wall and peripheral wall means extending upwardly from the periphery of said bottom wall and lid means molded of foamed plastic movable between opened and closed relation with said container so as to define an accessible insulated interior chamber therein, the improvement which comprises in combination therewith, said bottom wall having interior surface means formed in the central portion thereof and provided with a plastic annular insert having a threaded configuration secured within an annular recess formed in the bottom wall of said container and spaced inwardly from a juncture of said peripheral wall means therewith, and a bait receptacle having a bottom wall and a peripheral wall means extending upwardly from the periphery thereof, the bottom portion of said bait receptacle having exterior surface means of threaded configuration complementary with said interior surface means for detachable threaded engagement therewith to fixedly secure said bait receptacle within said chamber in an operative position therein wherein the peripheral wall means thereof extends upwardly from the bottom wall of said container in annularly spaced relation with the peripheral wall means thereof, the exterior size of said bait receptacle being substantially less than the interior size of said chamber so as to provide a substantial space within said chamber exteriorly of the peripheral wall means of said bait receptacle for the support of a solid cooling agent therein capable of maintaining bait and the like disposed within said bait receptacle in a fresh condition for an extended period of time.

2. The improvement as defined in claim 1 wherein a plurality of bait receptacles are detachably fixedly secured by corresponding complementary interior and exterior surface means in a plurality of operative positions within said chamber.

3. The improvement as defined in claim 1 wherein said bait receptacle includes an opened top defined by the upper edge of the peripheral wall means thereof disposed in a position to be closed by said lid means when said bait receptacle is in its operative position and said lid means is in closed relation to said container.

* * * * *